Dec. 24, 1968 E. W. VOORHOEVE 3,418,588

LINEARIZED MAGNETIC AMPLIFIERS

Filed May 3, 1965 2 Sheets-Sheet 1

Dec. 24, 1968 E. W. VOORHOEVE 3,418,588

LINEARIZED MAGNETIC AMPLIFIERS

Filed May 3, 1965 2 Sheets-Sheet 2

1

3,418,588
LINEARIZED MAGNETIC AMPLIFIERS

Ernst W. Voorhoeve, Maple Glen, Pa., assignor to Leeds & Northrup Company, Philadelphia, Pa., a corporation of Pennsylvania Filed May 3, 1965, Ser. No. 452,485
4 Claims. (Cl. 330—8)

ABSTRACT OF THE DISCLOSURE

There are disclosed magnetic amplifiers of self-saturating, push-pull type whose core-resetting circuitry is similar to that of Cockrell Patent 3,271,690 with addition of means for compensating for non-linearities of the input/output characteristic at low input levels. The compensating means is capacitive-reactance means connected across one of the mixing resistors in the amplifier output circuit, or across two output windings whose pair of cores is alternatively reset by current through a reset resistor from a center-tapped AC source, or across another two output windings whose pair of cores is alternatively reset by current induced in a common signal-input winding of the amplifier upon setting of said first pair of cores.

This invention relates to magnetic amplifiers, and particularly to core-resetting circuitry for self-saturating, push-pull, full-wave magnetic amplifiers.

In accordance with the present invention, the core-resetting circuitry of a magnetic amplifier includes capacitive-reactance means effective to compensate or correct for non-linearity of the input/output characteristic of the amplifier at low input-signal levels.

More specifically, and as applied to a push-pull, full-wave magnetic amplifier, a compensating capacitance may be connoceted either across one of the pair of mixing-resistors connected between the output terminals of the amplifier or across the output terminals of the output windings of two cores, one from each of the two push-pull pairs. In both cases, the capacitance means serves as a lead network providing the greater excitation required for resetting the cores to complete saturation at low input-signal levels.

The invention further resides in magnetic amplifiers whose core-resetting circuits include new and useful features of combination and arrangement hereinafter described and claimed.

For a more detailed understanding of the invention, reference is made to the following description of preferred embodiments thereof and to the accompanying drawings in which.

Figure 1:
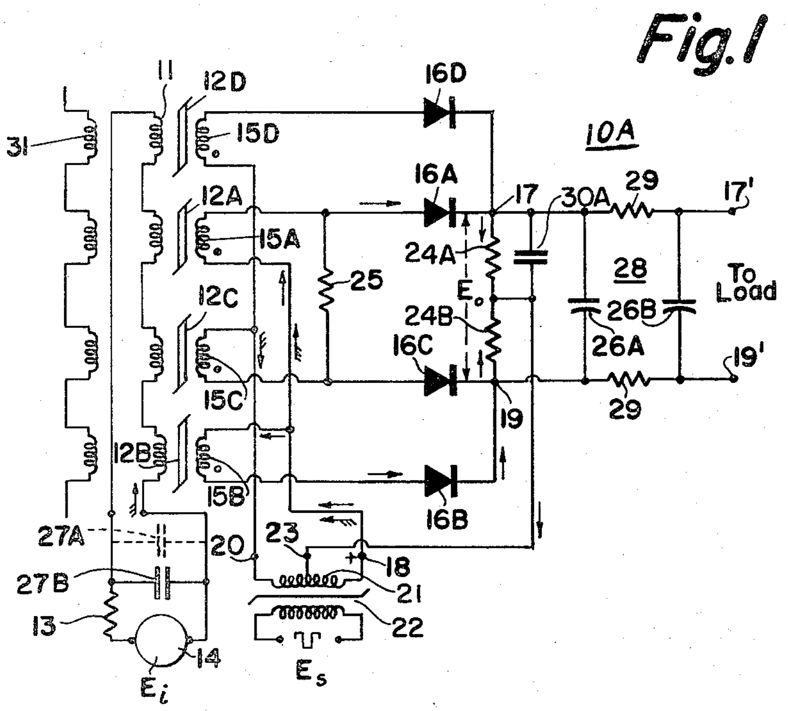
FIGS. 1 and 2 are circuit schematics of two magnetic amplifiers whose core-resetting circuitry embodies two different forms of the invention.
Figure 2:
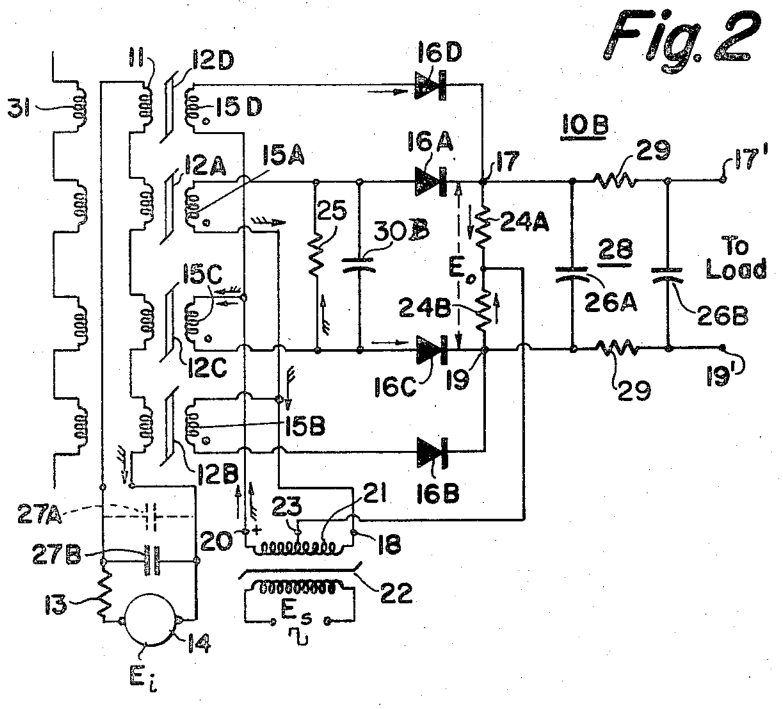

Two self-saturating, push-pull, full-wave magnetic amplifiers 10A, 10B embodying the present invention in two different forms are shown in FIGS. 1 and 2 respectively. The circuitry common to both species is first described herein and is similar to that described and claimed in co-pending application Ser. No. 258,267, filed Feb. 13, 1963, and which has issued as Patent No. 3,271,690.

The signal input winding 11 is coupled to all four of the

2 saturable cores 12A–12D and is connected, preferably or usually through a resistor 13, to a source 14 of signal voltage $E_i$. In general, the source 14 may be any circuit or device for producing a DC voltage $E_i$ or a DC current $I_i$ representative of a condition under measurement. For example, the source may be a temperature-responsive thermocouple which supplies a DC current of fixed polarity and of magnitude representative of temperature; it may be an ion chamber whose output current pulses are of unidirectional polarity and of magnitude proportional to radiation level or nuclear activity level; or it may be a balanceable measuring network such as a bridge or potentiometer suplying a DC signal of polarity dependent upon the sense of unbalance and of magnitude representing the magnitude or change in magnitude of a measured variable.

The output winding 15A of core 12A is connected in series with the rectifier or diode 16A between the output terminal 17 of the amplifier and the terminal 18 of a source of switching voltage $E_s$. The output winding 15B of core 12B is connected in series with the diode 16B between the output terminal 19 of the amplifier and terminal 18 of the switching voltage source $E_s$. Specifically, terminal 18 may be one of the end terminals 18, 20 of the secondary winding 21 of transformer 22 which is energized from a square-wave pulse generator or other suitable source of switching pulses. The intermediate or center tap terminal 23 of source $E_s$ is connected via mixing resistors 24A, 24B to the amplifier output terminals 17, 19 respectively. The pair of cores 12A, 12B and diodes 16A, 16B form one-half of the full-wave arrangement with the cores 12A, 12B inductively coupled in push-pull relation to the signal input source 14 by the common input winding 11.

The output winding 15C of core 12C is connected in series with rectifier 16C between the output terminal 19 of the amplifier and terminal 20 of the switching voltage source. The output winding 15D of core 12D is connected in series with the rectifier 16D between output terminal 17 of the amplifier and terminal 20 of the switching voltage source. The cores 12C, 12D of this second pair are inductively coupled in push-pull relation by winding 11 to the input-signal source 14: with the associated pair of rectifiers 16C, 16D, they form the other half of the full-wave rectifier system of the amplifier.

With the circuitry thus far described, when the switching voltage terminal 18 is positive with respect to center tap 23 (see FIG. 1), the output windings 15A, 15B of the first pair of cores 12A, 12B drive these cores to magnetic saturation in one sense from a preset flux level, the extent of change of flux level of one of the cores depending upon the magnitude of the input signal; and when the switching voltage 20 is positive with respect to the center tap 23 (see FIG. 2), the output windings 15C, 15D of the second pair of cores 12C, 12D drive them to saturation in one sense from a preset flux level, the extent of change of flux level of one of the cores depending upon the magnitude of the input signal. Such setting or gating of the cores occurs in each cycle of the applied switching voltage.

Resetting of the cores of both pairs back to their original respective flux levels involves resistor 25 for resetting of two of the cores and input winding 11 for resetting of the other two of the cores. For purposes of explanation, it will be considered that for positive half-waves of switching voltage $E_s$, the terminal 18 is positive (FIG. 1) and that for negative half-waves of the switching voltage, the terminal 20 is positive (FIG. 2).

First considering the events occurring during a positive half-wave of switching voltage $E_s$, reference is made to FIG. 1. The path of the gating pulse (unfeathered arrows) for core 12A may be traced from terminal 18 of source $E_s$, through output coil 15A, diode 16A and mixing resistor 24A back to intermediate terminal 23 of source $E_s$. The path of the gating pulse (unfeathered arrows) for core 12B may be traced from terminal 18 of source $E_s$, through output coil 15B, diode 16B and mixing resistor 24B back to intermediate terminal 23 of source $E_s$. Except when the input signal $E_i$ is of zero magnitude, the net or differential voltage $E_0$ across the mixing resistors 24A, 24B is of finite value, is of sense corresponding with the sense or polarity of the input signal, and is effective to produce flow of current through any load connected to the output terminals of the amplifier.

Also during a positive half-wave of the switching voltage $E_s$, a resetting-current pulse (feathered arrow) for core 12C flows from terminal 18 of source $E_s$ through output winding 15A, resistor 25, output winding 15C of core 12C back to terminal 20 of source $E_s$. The value of resistor 25 is so selected for the current/magnetic characteristic of the cores to permit a sufficiently large magnetizing current for resetting of core 12C approximately halfway to saturation in opposite sense.

Also during a positive half-wave of switching voltage $E_s$, the core 12D is reset by a magnetizing current pulse (feathered arrow) induced in winding 11 in the signal-input circuit. This magnetically-induced reset pulse for core 12D is the net voltage effect of the gating pulses for push-pull cores 12A, 12B and the resetting pulse for core 12C—all of the latter being derived by direct coupling to the source of switching voltage.

For the lower switching frequencies, the distributed capacitance 27A of the common coupling coil 11 of the cores 12A–12D may be supplemented by external capacitance 27B to provide a loop circuit of sufficiently low impedance for effective resetting of core 12D by magnetic induction: such external capacitance may not be necessary for the higher core-switching frequencies or for input-signal sources having low impedance. Core-switching frequencies from 5 kc. to 100 kc. have proved suitable and without indication that higher or lower frequencies would be unsuitable.

In brief resumé of the events occurring during each positive half-wave of the core-switching voltage $E_s$: the cores 12A, 12B of one push-pull pair are set to produce an output-voltage pulse across amplifier output terminals 17, 19; the core 12C of the second pair of push-pull cores is reset by direct coupling to the source of switching voltage $E_s$ via resistor 25; and core 12D of the second pair of push-pull cores is reset by its inductive coupling to the input-loop circuit common to all cores. The diodes 16C, 16D are not conductive for this half-cycle of the core-switching voltage.

During each negative half-wave of the core-switching voltage $E_s$: the cores 12C, 12D of the second pair of push-pull cores are set to produce an output-voltage pulse across the amplifier output terminals 17, 19; the core 12A of the first pair of push-pull cores is reset by direct coupling through resistor 25 to the switching voltage source; and core 12B of the first pair of cores is reset by its inductive coupling to the input-loop circuit common to all cores. The rectifiers 16A, 16B do not conduct for this half-cycle of the core-switching voltage.

More specifically, the path of the gating pulse (unfeathered arrows) for core 12C may be traced from terminal 20 of source $E_s$ (FIG. 2) through output coil 15C of core 12C, rectifier 16C, and mixing resistor 24B back to intermediate terminal 23 of source $E_s$. The path of the gating current (unfeathered arrows) for the other core 12D of this pair may be traced from terminal 20 of source $E_s$ through the output coil 15D of core 12D, rectifier 16D, and mixing resistor 24A back to intermediate terminal 23 of switching source $E_s$.

The path of the resetting pulse (feathered arrows) for core 12A may be traced from terminal 20 of source $E_s$ (FIG. 2) through output winding 15C of core 12C, resistor 25 and output winding 15A of core 12A back to terminal 18 of source $E_s$. The core 12B of the pair 12A, 12B is reset by the pulse (feathered arrow) induced in the input loop circuits 11, 27A, 27B by the net effect of the gating pulses for cores 12C, 12D and the resetting pulse for core 12A.

The output of the amplifiers 10A, 10B as thus far described appears between the terminals 17, 19 as a series of pulses of negative or positive polarity dependent upon the polarity of the DC input signal and of duration dependent upon the magnitude of the input signal. To convert such output pulses to a steady DC output, a filter network 28 comprising, for example, capacitors 26A, 26B and resistors 29, 29 is interposed between the amplifier terminals 17, 19 and the load terminals 17′, 19′.

Figure 3:
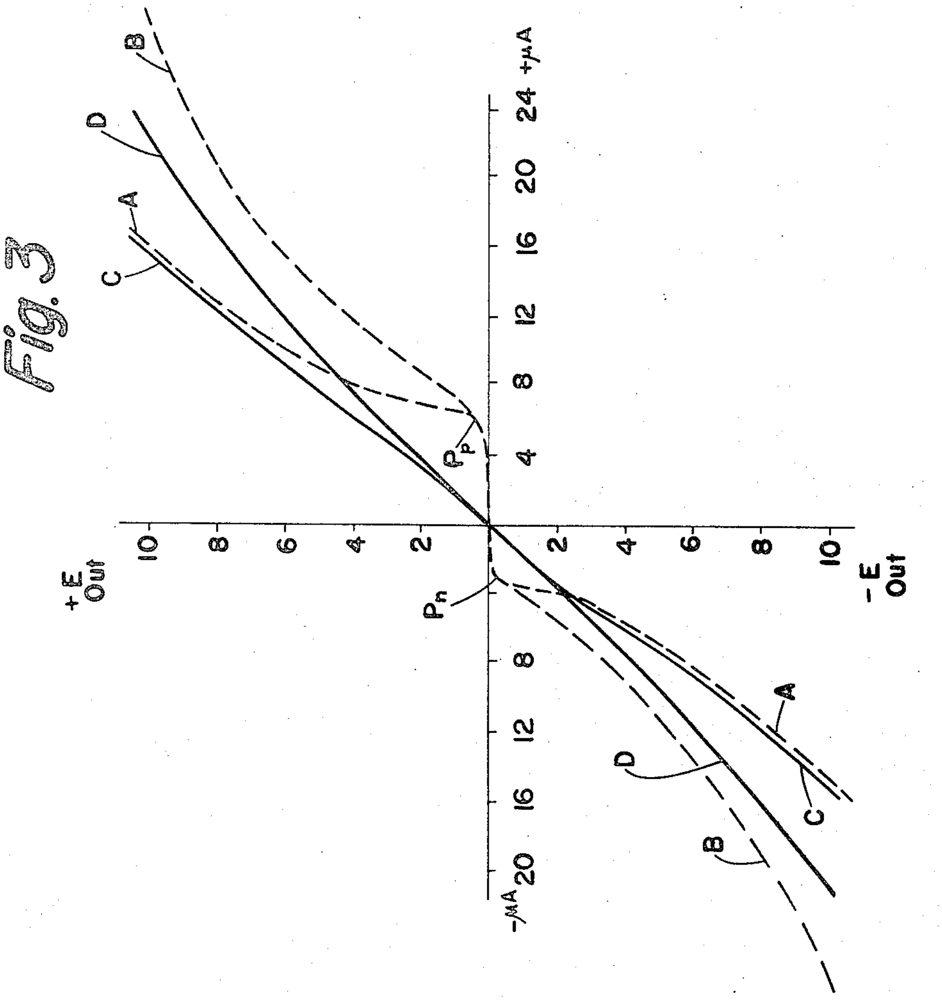
FIG. 3 shows four input/output characteristics referred to in discussion of FIGS. 1 and 2.

With the amplifier circuitry as thus far described, the input/output characteristic (both under no-load and load conditions—Curves A, B respectively of FIG. 3) is markedly non-linear having pronounced inflection points $P_p$, $P_n$ at low input-signal values both for positive and negative signal inputs. Such non-linearity is undesirable for most measuring, recording and/or control applications.

In amplifier 10A of FIG. 1, such non-linearity is compensated or corrected by shunting one of the mixing resistors 24A, 24B with capacitor 30A. The range of optimum value of this capacitor is dependent upon various factors including the gate-switching rate or frequency, the squareness-ratio and the $\Delta H$ characteristics of the cores and to lesser extent the effective input capacitors of the filter. A suitable value is most conveniently determined by experiment on an amplifier whose choice of other parameters has been chosen to meet operating requirements for a given use; for example, with a core-switching frequency of 5 kc., with a filter 28 whose capacitors 26A, 26B are respectively 1 $\mu$f. and 5 $\mu$f. and whose resistors 29, 29 are 56 ohms, and with cores 12A–12D having poor squareness ratio and high $\Delta H$, a suitable value for capacitor 30A is about 0.01 $\mu$f. In production runs of amplifiers shown in FIG. 1, the capacitor 30A may be in the range of say 0.005 $\mu$f. to 0.02 $\mu$f. and optimized for the gating frequency to be used by the customer.

Although the theory is not yet wholly resolved, it appears that capacitor 30A serves as a lead network effective to send a slug of current ahead of the normal flow in the reset half-cycles so as to provide, at low signal-input levels, the greater reset excitation required to bring the cores 12A, 12C to complete saturation within the corresponding reset half-cycle. By such means, the delay otherwise caused by the input capacitance of the filter is compensated and good input/output linearity is achieved for low input signals even with quite inferior cores, i.e., cores having poor squareness ratio and high $\Delta H$.

The marked improvement in linearity is illustrated in FIG. 3 by full-line curves C, D for unloaded and loaded conditions respectively. The no-load curve C (capacitor 30A in circuit) is smooth with good linearity from zero output to maximum output of either polarity: this is in marked contrast to the no-load curve A (without capacitor 30A) in which the output increases very slowly with increase of input below either inflection point $P_p$ or $P_n$; sharply increases with increase of input for a short range above the inflection point; and then more slowly increases with further increase of input. The load curve D with capacitor 30A in circuit and a load resistance of say 2.2 kilohms is also smooth with good linearity from zero output to maximum output of either polarity. It is also to be noted from comparison of curves B and D that the gain of the loaded amplifier 10A, with compensating capacitor 30A, is not only linear but is also higher throughout the operating range.

In amplier 10B of FIG. 2, the non-linearity of the input/output characteristic (dotted-line curves A,B of FIG. 3) is compensated or corrected by shunting the reset resistor 25 for cores 12A, 12C with a capacitor 30B. So connected, the capacitor 30B is across the output terminals of output windings 15A, 15C of cores 12A, 12C: alternatively, the compensating capacitor 30B may be connected across the output terminals of output windings 15B, 15D of the other pair of push-pull cores 12B, 12D. The range of optimum values of this capacitor, like that of capacitor 30A of FIG. 1, depends primarily upon the core-switching frequency, the squareness ratio and ΔH of the cores and to lesser extent upon the effective input capacitance of the filter 28. Again, such range of optimum values is most conveniently determined by experiment; for example, for amplifier 10B, with a core-switching frequency of 5 kc., with filter 28 having capacitors 26A, 26B of 1 μf. and 5 μf. respectively, and with Permalloy cores of high squareness characteristic, a suitable value of capacitor 30B is about 300 μμf. In production runs of amplifiers of this type (FIG. 2), the capacitor 30B may be of the adjustable type covering a range of say 100 μμf. to 500 μμf. so that its value may be set to optimum for the gating frequency to be used by the customer. With a capacitance of much below 100 μμf., the improvement in linearity usually is insufficient, and for a capacitance value much above 500 μμf., there is needless loss of amplifier gain.

Again, although the theory is not wholly resolved, it is believed that capacitor 30B serves as a lead network effective to send a slug of current ahead of the normal flow in the reset half-cycles so to provide, at low input-signal levels, the greater reset excitation required to bring the cores 12A, 12C to complete saturation within the corresponding reset half-cycle. By such means, the delay in switching otherwise due to the effective input capacitance of filter 28 is compensated and good linearity of the amplifier input/output characteristic is achieved even with cores having relatively poor squareness ratio and high ΔH characteristic.

Again, the marked improvement in linearity and in gain, particularly at low input levels, is evident from comparison of curves A, C for no-load conditions and from comparison of curves B, D for load conditions.

For some applications, the magnetic amplifiers 10A, 10B are used without feedback. In other applications, the control winding 31, common to cores 12A–12D, is supplied with DC current proportional to the amplifier output either as appearing at terminals 17′, 19′ or at some subsequent point in the system; for example, at the output terminals of an operational amplifier supplied from terminals 17′, 19′. In such cases, the magnetic amplifier 10A or 10B is in a closed-loop system with degenerative feedback.

Figure 4:
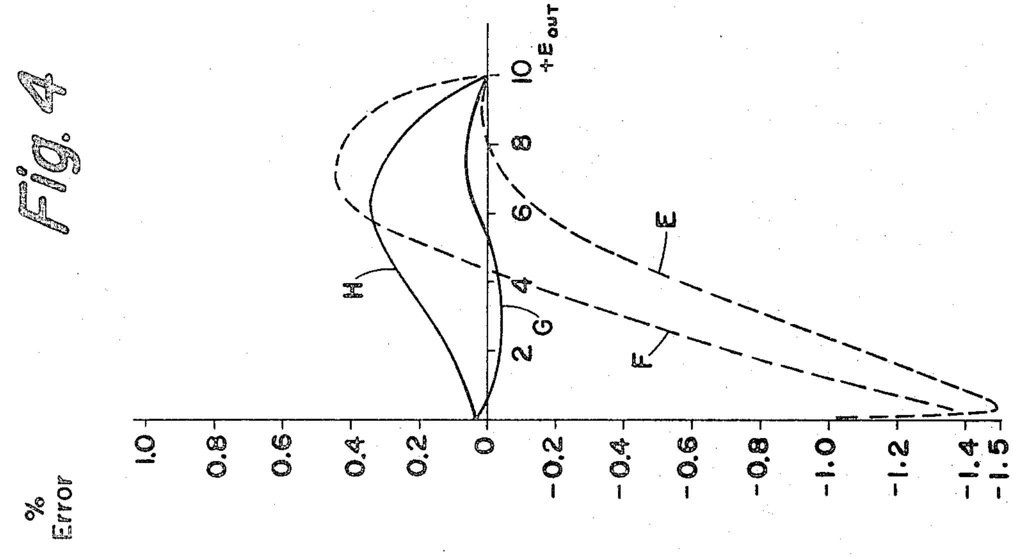
FIG. 4 shows four output-error curves referred to in discussion of FIGS. 1 and 2.

In such closed system, the output-error characteristic of the magnetic amplifier, without capacitor 30A or 30B, is similar to dotted-line curve E (FIG. 4) for the no-load state and by dotted-line curve F for load state (load of 2.2 kilohms). For clarity of illustration, the error curves shown are only for output signals of positive polarity. It is to be noted that at low input-signal levels, the error may be nearly as great as −1.5% and at higher input-signal levels may be as much as +0.4% depending on load. With either capacitor 30A of FIG. 1 or capacitor 30B of FIG. 2, the output error, as shown by the full-line curves G, H, is substantially less, both under no-load and load conditions. Specifically, as shown by curve G, the error does not exceed ±0.1% at no-load and does not exceed about +0.35% for a normal load of 2.2 kilohms.

It will be understood the invention is not limited to the preferred embodiments shown, but comprehends modifications and equivalents within the scope of the appended claims: for example, instead of all of the compensating capacitance being across one of the mixing resistors, part of it may be at such location as shown in FIG. 1, and the remainder of it may be across the output terminals of one of the pairs of output windings 15A, 15C or 15B, 15D as shown in FIG. 2.

What is claimed is:

1. A push-pull full-wave magnetic amplifier comprising:
two pairs of saturable cores (12A, 12B:12C, 12D) each having an output winding (15A, 15B, 15C, 15D),
a signal-input circuit comprising an input winding (11) coupled in push-pull relation to the two cores of each pair,
a center-tapped alternating-current source (21), one end terminal (18) of said source being connected to the common terminal of the output windings (15A, 15B) of the first pair of cores (12A, 12B), and the other end terminal (20) being connected to the common terminal of the output windings (15C, 15D) of the second pair of cores (12C, 12D),
a first pair of diodes (16A, 16B) each connected from the other terminal of each output winding (15A, 15B) of said first pair of cores (12A, 12B) to the center-tap (23) of said source (21) through a mixing resistance means (24A, 24B),
a second pair of diodes (16C, 16D) each connected from the other terminal of each output winding (15C, 15D) of said second pair of cores (12C, 12D) to the center-tap (23) of said source (21) through a mixing resistance means (24B:24A),
reset-resistance means (25) connecting the two output windings 15A, 15C) of two cores (12A, 12C) of different pairs in series across the end terminals (18, 20) of said source (21) so to provide for alternate resetting of said cores (12A, 12C) by magnetizing current pulses from said source, the other two cores (12B, 12D) of the different pairs being alternately reset by magnetizing pulses induced in said input winding (11) common to all cores in consequence of the flow of current pulses from said source through said reset resistance means (25) and said two output windings (12A, 12C) in series therewith, and
means for compensating for non-linearity of the input/output characteristic of the amplifier at low levels of signal input comprising capacitive-reactance means (30A, 30B) in shunt to one of said resistance means (25, 24A, 24B).

2. A magnetic amplifier as in claim 1 in which the compensating means comprises a capacitive-reactance means in shunt to one only of said mixing-resistance means.

3. A magnetic amplifier as in claim 1 in which the compensating means comprises a capacitive-reactance means in shunt to the reset resistance means.

4. A push-pull full-wave magnetic amplifier comprising:
two pairs of saturable cores (12A, 12B:12C, 12D) each having an output winding (15A, 15B, 15C, 15D),
an input winding (11) inductively coupled in push-pull relation to the two cores of each pair,
a mixing circuit (24A, 24B) connected across the output terminals (17, 19) of said amplifier and having an intermediate terminal,
a source (21) of core-switching pulses having an intermediate terminal (23) connected to said intermediate terminal of said mixing circuit, an end terminal (18) of one instantaneous polarity connected to the common terminal of the output windings (15A, 15B) of one pair of cores (12A, 12B), and an end terminal (20) of opposite instantaneous polarity connected to the common terminal of the output windings (15C, 15D) of the other pair of cores (12C, 12D),
a full-wave rectifier including two pairs of diodes (16A, 16B:16C, 16D), the diodes of each pair connecting the output windings of a corresponding pair of cores to opposite end terminals (17, 19) of said mixing circuit,
resistance means (25) connecting the two output windings (15A, 15C) of two cores (12A, 12C) of different pairs in series across the end terminals (18, 20) of said source (21) so to provide for alternate resetting of said cores by current pulses from said source, the other two cores (12B, 12D) of the different pairs being alternately reset by current pulses induced in said input winding (11) common to all cores in consequence of the flow of current pulses from said source through said resistance means (25) and said two output windings (15A, 15C) in series therewith, and means for compensating for non-linearity of the input-output characteristics of the amplifier at low levels of signal-input comprising capacitive-reactance means (30B) connected from the output-winding connection to one of the diodes (16A, 16B) of one of said pairs to the output-winding connection of one of the diodes (16C, 16D) of the other of said pairs.

References Cited

UNITED STATES PATENTS

| | | | |
|---|---|---|---|
| 2,872,533 | 2/1959 | Hubbard | 330—8 X |
| 2,961,599 | 11/1960 | Geyger | 330—8 X |

NATHAN KAUFMAN, *Primary Examiner.*

U.S. Cl. X.R.

323—89.